United States Patent Office 3,007,883
Patented Nov. 7, 1961

3,007,883
CELLULAR POLYURETHANES RESEMBLING NATURAL SPONGE AND METHOD OF PREPARING SAME
Fritz Schmidt and Günther Braun, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Oct. 23, 1957, Ser. No. 691,797
Claims priority, application Germany Oct. 25, 1956
7 Claims. (Cl. 260—2.5)

This invention relates generally to the preparation of cellular polyurethanes and, more particularly, to a cellular polyurethane having a porous structure resembling that of natural sponge and to a method for making the same.

It has been proposed heretofore to prepare cellular polyurethanes by a method wherein an organic compound having reactive hydrogens is reacted with an organic polyisocyanate. One such process is disclosed in U.S. Patent 2,764,565. These heretofore available processes produce a cellular product having a substantially uniform cell structure if the components are intimately mixed before the chemical reaction. Ordinarily, a product having a substantially uniform pore structure is desirable where the foam is to be used in upholstery, insulation, carpet underlay, and the like. Such cellular polyurethanes are not particularly desirable for use as a sponge because they do not have a pore structure which resembles that of a natural sponge and they do not absorb a sufficient quantity of water. If the heretofore available processes are modified by varying the procedure used for mixing the components together or by other mechanical means, the resulting product sometimes may have an irregular pore structure, but it is impossible to reproduce the result and the foam does not have the desirable soft feel. Moreover, such sponges have no better water-absorption characteristics than a similar polyurethane having a uniform pore structure. It has also been proposed to add an emulsifying agent to the reaction mixture which produces the polyurethane. Among these surface active agents are dioctyl sodium sulfosuccinate, lecithin, lanolin, potassium oleate, and the like. These surface active agents are added to the mixture to provide a cellular polyurethane having a uniform cellular structure of only very small cells. Such products are no more absorbent than those prepared without the surface active agents.

It is therefore an object of this invention to provide a novel method for preparing cellular polyurethanes which produces a product having a cellular structure resembling that of a natural sponge. Another object of the invention is to provide a method for preparing cellular polyurethanes having both large and small cells. A further object of the invention is to provide a cellular polyurethane resembling natural sponge in cellular structure and in water-absorption characteristics.

The foregoing objects as well as others are accomplished in accordance with this invention, generally speaking, by providing a method for preparing cellular polyurethanes wherein an organic compound having at least two reactive hydrogens, a molecular weight of from about 1500 to about 3000, not substantially more than about four hydroxyl groups per 3000 units of molecular weight, and an acid number of from 0 to not substantially more than 2 is reacted with an organic polyisocyanate and water in the presence of lecithin. The organic polyisocyanate, water, and organic compound having reactive hydrogen atoms react to form a cellular polyurethane, and because of the presence of the lecithin in the reaction mixture, the resulting product has a cellular structure resembling that of natural sponge. The product is capable of absorbing larger quantities of water than a cellular polyurethane prepared from a similar reaction mixture but without lecithin. Insofar as is known, lecithin is the only material of this type that will produce the result. The surface active agents heretofore disclosed are unsuitable for the purpose. Moreover, it is essential that the organic compounds have the specified molecular weight and contain the specified number of hydroxyl groups. Even more important, the organic compounds having the specified molecular weight must not have an acid number substantially above 2. Furthermore, for best results the reaction mixture must contain from about 0.1 percent to about 5 percent lecithin, and a reaction mixture containing lecithin in this concentration is preferred.

Best results are obtained when the reaction mixture contains from about 0.5 mol to about 1.5 mols organic polyisocyanate for each 17 grams of hydroxyl groups contained in the organic compound containing reactive hydrogen atoms. A reaction mixture containing the organic polyisocyanate in this quantity and a process for preparing a cellular polyurethane from such a reaction mixture is thus preferred. Best results also require that the reaction mixture contain from about 0.5 percent to about 10 percent by weight water, and it is thus preferred to use this quantity of water in preparing the reaction mixture. The reaction mixture may contain any suitable emulsifier, such as, for example, those disclosed in U.S. Patent 2,764,565, and it is preferred that the reaction mixture contain these emulsifiers in a quantity within the range of from about 0.5 percent to about 10 percent. The reaction mixture preferably should contain from about 0.1 percent to about 4 percent of a catalyst, such as, for example, a tertiary amine or phosphine, such as disclosed in the aforesaid patent.

Any suitable organic compound having reactive hydrogen atoms, the hereinbefore specified molecular weight, hydroxyl content, and acid number may be used. It is much preferred, however, to use a polyhydroxy compound, such as, for example, an hydroxyl terminated polyester, polythioether or polyalkylene ether glycol. The polyalkylene ether glycol may or may not contain hetero atoms other than oxygen in the chain, for example, a polyether having both sulfur and oxygen hetero atoms may be used. Suitable examples of such compounds are disclosed in U.S. Patent 2,764,565. The polyester may be the esterification product of any suitable dicarboxylic acid and polyhydric alcohol. The polyalkylene ether glycol may be the condensation product of ethylene oxide, propylene oxide or other suitable alkylene oxides. In some instances, it may be desirable to react the polyhydroxy compound with an excess of a polyisocyanate to prepare a prepolymer having terminal NCO groups and to then bring about the reaction with the water in the presence of the lecithin. The invention thus contemplates a process wherein the organic polyisocyanate is first reacted with a specified organic compound having hydrogen atoms. The resulting prepolymer is later reacted with water while the reaction mixture contains lecithin in the specified quantity.

Any suitable organic polyisocyanate may be used including those disclosed in U.S. Patent 2,764,565. Examples of such polyisocyanates are 1,2,4-toluylene diisocyanate; 1,2,6-toluylene diisocyanate; 1,4-phenylene diisocyanate; 1,5-naphthylene diisocyanate; triphenylmethane-4,4',4''-triisocyanate; diphenylmethane - 4,4'' - diisocyanate; dimethyl diphenyl-4,4'-diisocyanate; and the like.

The lecithin used in accordance with this invention may be a chemically pure product or it may be only a technical grade, such as, for example, commercial grade soya lecithin. As indicated hereinbefore, the lecithin may be added to the reaction mixture at the time the organic polyisocyanate and the organic compound having reactive hydrogens are mixed or it may be added later if the water is to be added after the first said components have been mixed together. In other words, it appears that the lecithin need to be present only in the reaction where carbon dioxide is produced.

The components may be mixed together by any suitable process but it is preferred to mix them together by the injection process disclosed in U.S. Patent 2,764,565 in order to insure that intimate mixing is achieved substantially immediately and before any substantial amount of chemical reaction. The lecithin may be added as such or it may be suspended in water. It is advantageous in some instances to prepare a suspension of lecithin in water which also contains the catalyst and any emulsifying agents to be used in the process. This suspension may then be mixed with the other components of the reaction mixture. In another form of the invention, a solution of lecithin in any suitable solvent therefor may be added to the organic compound having reactive hydrogens or to the activator mixture containing catalyst and water or, if desired, the solution of lecithin may be added separately to a mixture of the other components. Any suitable solvent may be used for preparing the solution of lecithin in so long as it does not contain any reactive hydrogen atoms which would react with the organic polyisocyanate. Examples of suitable solvents include toluene, xylene, methylene chloride or other suitable hydrocarbon solvents. It is preferred to use concentrated solutions in order to reduce the volume required to be mixed with the reaction mixture.

It has been found that the presence of lecithin in the reaction mixture does not deleteriously affect the physical characteristics of the resulting cellular polyurethane. In other words, the cellular polyurethane will have substantially the same physical characteristics as it would have if prepared from a reaction mixture of the same composition except that it does not contain lecithin. The product not only has the natural sponge-like appearance of partly small cells and partly coarse cells and good water-absorption characteristics, but it also has a softness resembling that of natural sponge. The product is particularly desirable for use as a sponge for bathing purposes.

In order better to describe and further clarify the invention, the following are specific examples thereof.

*Example 1*

To about 100 parts of a polyester with an hydroxyl content of about 1.8 percent, produced from about 15 mols adipic acid, about 16 mols diethylene glycol, and about 1 mol trimethylol propane are added about 2 parts of a 50% solution of lecithin in toluene. This mixture is mixed thoroughly with about 3 parts of an ester obtained from about 2 mols diethylaminoethanol and about 1 mol adipic acid, about 1.5 parts of diethylammonium oleate, about 1.5 parts of a 54% aqueous solution of the sodium salt of castor oil sulfate, and about 1.5 parts of water and then stirred intensively with about 36 parts of toluylene diisocyanate. It is poured into molds in which the mixture begins to foam immediately. A soft flexible foam with nonuniform fine and coarse cells and good water absorption is obtained.

*Example 2*

To about 100 parts of a polyester of an hydroxyl content of about 1.5 percent produced from about 1 mol of adipic acid and about 1.1 mols diethylene glycol are added about 2 parts of a 50% solution of lecithin in xylene and mixed thoroughly with the same activator mixture as in Example 1 and then stirred intensively with about 34 parts of toluylene diisocyanate. It is poured into molds in which the mixture begins to foam at once. A flexible foam with great elasticity and pronounced natural sponge structure is obtained which corresponds in physical strength properties to the normal foams.

*Example 3*

To about 100 parts of a polythioether with an hydroxyl content of about 1.4 percent produced by condensation from about 4 mols thiodiglycol and about 1.5 mols diethylene glycol are mixed with about 2 parts of a 50% solution of lecithin in toluene and mixed thoroughly with the same activator mixture as in Example 1. With intensive stirring, about 34 parts of toluylene diisocyanate are added to this mixture and it is poured into molds. A foam with natural sponge structure and a very soft feel is obtained.

*Example 4*

To about 100 parts of a polyester with an hydroxyl content of about 1.8 percent produced from about 15 mols adipic acid, about 16 mols diethylene glycol and about 1 mol trimethylolpropane are added about 1.75 parts of an aqueous lecithin dispersion which contains about 0.25 part lecithin. This mixture is mixed thoroughly with about 3 parts of an ester obtained from about 2 mols diethyaminoethanol and about 1 mol adipic acid, about 1.5 parts diethyl ammonium oleate, and about 1.5 parts of an aqueous solution of the sodium salt of castor oil sulfate and then stirred intensively with about 36 parts toluylene diisocyanate. It is poured into molds in which the mixture begins to foam at once. A soft flexible foam with natural sponge structure which absorbs water very well results.

*Example 5*

100 parts of polypropylene glycol having the OH number 56 are reacted with 40 parts of toluylene diisocyanate at 100° C. for 3 hours to form a prepolymer having a NCO content of 8.8.%. 100 parts of this prepolymer are intimately mixed with an activator mixture of 2.0 parts of N-dimethyl benzylamine
0.2 part of pentamethyldiethylene diamine
1.8 parts of water
1.0 part of silicone oil
1.0 part of a 50% solution of soyalecithin in toluol The mixture is filled into molds wherein a spongy product is formed with foaming. The foamed product is very soft and hydrophilic and has pores which resemble a natural sponge.

It is to be understood that the foregoing examples are presented solely for the purpose of illustrating the invention and that any other suitable organic compound having reactive hydrogen atoms having the specified molecular weight, hydroxyl content, and acid number may be substituted in the foregoing examples and a suitable product will be obtained. Moreover, any other suitable organic polyisocyanate may be used in the foregoing embodiments instead of the one specified therein. The amount of lecithin and the concentration of the other components may be varied in so long as it falls within the limits specified hereinbefore.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for making a cellular polyurethane having a porous structure resembling that of natural sponge which comprises mixing together an organic polyisocyanate, water and from about 0.1% to about 5% lecithin with an organic compound having a molecular weight of from about 1500 to about 3000, an average of not more than about four hydroxyl groups per 3000 units of molecular weight, an acid number not greater than 2 and selected from the group consisting of hydroxyl polyesters prepared by reacting a polyhydric alcohol with a polycarboxylic acid, polyhydric polyalkylene ethers and polyhydric polythioethers.

2. A method for making a cellular polyurethane having a porous structure resembling that of natural sponge which comprises mixing together an organic polyisocyanate, from about 0.5% to about 10% water and from about 0.1% to about 5% lecithin with an organic compound having a molecular weight of from about 1500 to about 3000, an average of not more than about four hydroxyl groups per 3000 units of molecular weight, an acid number not greater than 2 and selected from the group consisting of hydroxyl polyesters prepared by reacting a polyhydric alcohol with a polycarboxylic acid, polyhydric polyalkylene ethers and polyhydric polythioethers, said organic polyisocyanate being present in a quantity of from about 0.5 mol to about 1.5 mols for each 17 grams of hydroxyl groups in said organic compound.

3. A method for making a cellular polyurethane having a porous structure resembling that of natural sponge which comprises mixing together an organic polyisocyanate, from about 0.5% to about 10% water and from about 0.1% to about 5% lecithin with an hydroxyl polyester prepared by reacting a polyhydric alcohol with a polycarboxylic acid and having a molecular weight of from about 1500 to about 3000, an average of not more than about four hydroxyl groups per 3000 units of molecular weight, and an acid number not greater than 2, said organic polyisocyanate being present in a quantity of from about 0.5 mol to about 1.5 mols for each 17 grams of hydroxyl groups in said hydroxyl polyester.

4. A method for making a cellular polyurethane having a porous structure resembling that of natural sponge which comprises mixing together an organic polyisocyanate, from about 0.5% to about 10% water and from about 0.1% to about 5% lecithin with a polyhydric polyalkylene ether having a molecular weight of from about 1500 to about 3000, an average of not more than about four hydroxyl groups per 3000 units of molecular weight, and an acid number not greater than 2, said organic polyisocyanate being present in a quantity of from about 0.5 mol to about 1.5 mols for each 17 grams of hydroxyl groups in said polyhydric polyalkylene ether.

5. A method for making a cellular polyurethane having a porous structure resembling that of natural sponge which comprises mixing together an organic polyisocyanate, from about 0.5% to about 10% water and from about 0.1% to about 5% lecithin with a polyhydric polythioether having a molecular weight of from about 1500 to about 3000, an average of not more than about four hydroxyl groups per 3000 units of molecular weight, and an acid number not greater than 2, said organic polyisocyanate being present in a quantity of from about 0.5 mol to about 1.5 mols for each 17 grams of hydroxyl groups in said polyhydric polythioether.

6. The product prepared by the process according to claim 1.

7. A method for making a cellular polyurethane having a porous structure resembling that of natural sponge which comprises mixing together an organic polyisocyanate, an organic compound having a plurality of hydroxyl groups reactive with —NCO groups, said organic compound being capable of forming a polyurethane by reaction with said organic polyisocyanate, said organic compound having a molecular weight of from about 1500 to 3000, an average of not more than four hydroxyl groups per 3000 units of molecular weight, an acid number not greater than about 2, from about 0.5% to about 10% by weight of water and from about 0.1% to about 5% lecithin.

References Cited in the file of this patent

UNITED STATES PATENTS 2,764,565  Hoppe et al. _____ Sept. 25, 1956
2,772,246  Simon et al. _____ Nov. 27, 1956

FOREIGN PATENTS 729,523  Great Britain _____ May 4, 1955